W. H. HYDE.
MILK-COOLER.

No. 181,347.  Patented Aug. 22, 1876.

Witnesses:
Fred. E. Knight
B. A. Benedict

Inventor:
William H. Hyde

UNITED STATES PATENT OFFICE.

WILLIAM H. HYDE, OF CORTLAND VILLAGE, NEW YORK.

IMPROVEMENT IN MILK-COOLERS.

Specification forming part of Letters Patent No. 181,347, dated August 22, 1876; application filed July 28, 1876.

*To all whom it may concern:*

Figure 1:
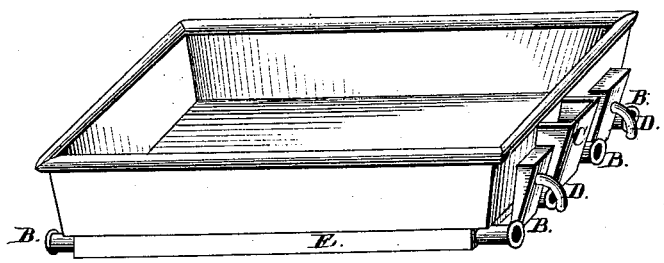
Figure 2:
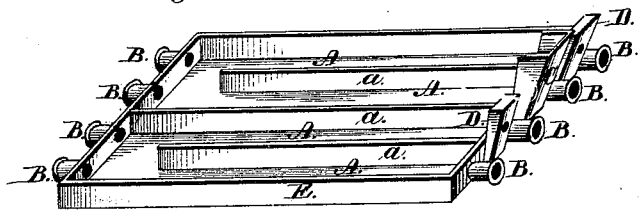

Be it known that I, WILLIAM H. HYDE, of Cortland Village, in the county of Cortland and State of New York, have invented certain new and useful Improvements in Milk-Pans; and I do hereby declare that the following is a full, clear, and exact description thereof, which will enable others skilled in the art to which it appertains to make and use the same, reference being had to the accompanying drawings, and to the letters of reference marked thereon, which form a part of this specification:

In the drawings, Figure 1 represents a perspective view of a milk-pan constructed according to my improvement. Fig. 2 represents a plan view of the bottom of the pan E detached, showing the compartments A A, the ventilating-orifices B B, and the inlet C, and outlets D D, of the water or other cooling medium.

These pans are made with a double bottom, E—that is, with a water or air tight chamber underneath the whole bottom of the pan—divided into compartments A A by means of water-tight partitions *a a* running parallel with each other lengthwise of the pan. The center partition extends along the whole length of the pan, from one end to the other, dividing the water or air chamber into two equal sections. The other partitions are made open at one end, so that the compartments of each section are made to communicate one with the other, thus forming a continuous channel from the common inlet C to either of the outlets D D through the various compartments of each section. Air, water, or steam, or any other medium for cooling or warming the milk is introduced between the double bottoms of the pans, and at one end, through the common inlet C. At that point, by means of the center partition, the cooling or warming medium is equally divided, one-half flowing along one side of the center partition, and the other along the other side, in each case following its respective channel through the consecutive compartments until it reaches its outlet. The outlets are raised above the bottom of the pan, so that the whole space between the double bottom is filled before any of the warming or cooling medium is discharged.

I am aware that other pans are made with spaces under and around the pan to contain a cooling medium, divided up into compartments by means of parallel partitions, so as to form a continuous channel for the water. But in such pans all of the consecutive compartments are so connected as to form one continuous channel, and the water is introduced at one corner, and is compelled to follow each consecutive compartment before it finds its outlet.

In making butter the milk must be kept at a certain uniform temperature. One of the principal objects of this class of pans is to be able, by means of either a warming or cooling medium, to bring the milk to the desired degree of temperature, and to keep it there. This should be done as soon as possible after it is set, and the cooling or warming process should operate as uniformly throughout the body of the milk as possible. My invention accomplishes this, and is substantially different from any other.

It will be readily understood that the milk through the middle of the pan has more heat, and will hold its original temperature longer, than at the sides of the pan, where it is acted upon by the surrounding temperature. Accordingly, my invention carries through the center compartments, where there is most heat, two currents of fresh water diverging to the opposite sides of the pan, so that where the milk is warmest the current of water is coolest, and at the sides of the pan, where the water is somewhat warmed, it is aided in its cooling process by the surrounding temperature; and by there being two separate currents, each circulating through only one-half of the space, the temperature of the cooling medium at its outlet is much less changed than where it is compelled to traverse all of the various compartments.

Another valuable feature of my invention consists in ventilating-orifices B B opening into the space under the pan, one at each end of each separate compartment. When the compartments are filled with water for cooling or warming the milk these holes are closed with suitable corks or plugs. At other times the plugs may be taken out, thus securing a free circulation of air throughout the compartments. Pans made without these ventilating-orifices have no means of drying the space between the bottoms, and water will stand therein and corrode the pans.

These pans are mounted upon legs of suitable height, and the milk is drawn off through a pipe leading from the bottom of the pan down through the cooling-space.

What I claim as my invention, and desire to have secured by Letters Patent, is—

A milk-pan constructed with a double bottom, E, having an open space between the double portions, for reception of a cooling or warming medium, divided into two equal sections, each section having its connected compartments A A with inlet and outlet passages C and D, carrying the said medium through the center compartments outward, and with ventilating-orifices B B, all combined and made substantially as and for the purposes above described.

In testimony that I claim the foregoing as my own I hereby affix my signature in presence of two witnesses.

WILLIAM H. HYDE.

Witnesses:
    B. B. WOODWORTH,
    FRANK DIBBLE.